(12) United States Patent
Hafner

(10) Patent No.: US 8,727,931 B2
(45) Date of Patent: May 20, 2014

(54) GEAR TRAIN UNIT AND ARRANGEMENT FOR A STAMPING PRESS

(75) Inventor: Josef Thomas Hafner, Rorschacherberg (CH)

(73) Assignee: Bruderer AG, Frasnacht (CH)

( * ) Notice: Subject to any disclaimer, the term of this patent is extended or adjusted under 35 U.S.C. 154(b) by 0 days.

(21) Appl. No.: 13/636,264

(22) PCT Filed: Mar. 8, 2011

(86) PCT No.: PCT/CH2011/000043
§ 371 (c)(1),
(2), (4) Date: Sep. 20, 2012

(87) PCT Pub. No.: WO2011/123959
PCT Pub. Date: Oct. 13, 2011

(65) Prior Publication Data
US 2013/0012349 A1     Jan. 10, 2013

(30) Foreign Application Priority Data
Apr. 9, 2010 (EP) ..................................... 10003804

(51) Int. Cl.
*F16H 3/44* (2006.01)
(52) U.S. Cl.
USPC ........................... 475/299; 475/330; 475/337
(58) Field of Classification Search
USPC .......... 475/275, 296, 298, 299, 330, 337, 270
See application file for complete search history.

(56) References Cited

U.S. PATENT DOCUMENTS

| | | | |
|---|---|---|---|
| 3,055,237 A | | 6/1959 | Magnuson |
| 3,598,188 A | * | 8/1971 | Foster ........................... 173/165 |
| 3,797,623 A | | 3/1974 | Gregorovich et al. |
| 4,365,525 A | * | 12/1982 | Imazaike ....................... 475/337 |
| 4,791,833 A | | 12/1988 | Sakai et al. |
| 4,869,139 A | * | 9/1989 | Gotman ........................ 81/475 |

(Continued)

FOREIGN PATENT DOCUMENTS

| | | |
|---|---|---|
| CH | 404324 A | 12/1965 |
| DE | 1174736 B | 7/1964 |

(Continued)

OTHER PUBLICATIONS

International search report for PCT/CH2011/000043 dated Apr. 7, 2011.

*Primary Examiner* — Justin Holmes
(74) *Attorney, Agent, or Firm* — McCormick, Paulding & Huber LLP

(57) ABSTRACT

The invention relates to a gear train unit comprising a plurality of planetary gear train stages, which are connected one after the other and which each comprise a ring gear (4, 4a, 4b), a sun gear (2a, 21, 21a) and a plurality of planet gears (3, 3a, 3b) supported on a planet carrier (5, 5a, 6), wherein the sun (2a, 21, 21a) of each following planetary gear train stage is formed by the planet gear carrier (5, 5a) of the preceding planetary gear train stage. The gear train unit comprises a drive element (2), which forms the sun gear (2a) of the first planetary gear train stage, and an output element (17), which is connected in a torsionally rigid manner to the planet gear carrier (6) of the last planetary gear train stage. The gear train unit can be shifted in such a way that either a first or a second gear ratio can be set.

20 Claims, 3 Drawing Sheets

(56) References Cited

U.S. PATENT DOCUMENTS

| | | | |
|---|---|---|---|
| 5,697,862 A | 12/1997 | Sommer | |
| 6,984,188 B2 * | 1/2006 | Potter et al. | 475/298 |
| 2006/0068968 A1 * | 3/2006 | Eisenhardt | 475/299 |
| 2009/0082168 A1 * | 3/2009 | Yen | 475/337 |

FOREIGN PATENT DOCUMENTS

| | | |
|---|---|---|
| DE | 2804061 A1 | 9/1969 |
| DE | 125530 A1 | 4/1977 |
| DE | 10007026 A1 | 8/2001 |
| DE | 202004010051 U1 | 9/2004 |
| EP | 0439684 A1 | 8/1991 |
| EP | 0519121 A2 | 12/1992 |
| EP | 1894708 A1 | 3/2008 |
| EP | 2008800 A1 | 12/2008 |
| FR | 1249299 A | 11/1960 |
| GB | 926920 A | 5/1963 |
| JP | 2001349394 A | 12/2001 |
| WO | 2009067416 A1 | 5/2009 |

* cited by examiner

GEAR TRAIN UNIT AND ARRANGEMENT FOR A STAMPING PRESS

CROSS REFERENCE TO RELATED APPLICATIONS

This application claims the priority of PCT Application No. PCT/CH2011/000043, filed on Mar. 8, 2011 and European Patent Application No. 10003804.1 filed on Apr. 9, 2012, the disclosures of which are incorporated herein by reference in their entirety.

TECHNICAL FIELD

The present invention relates to a gear train unit comprising a plurality of planetary gear train stages, which are connected one after the other, as well as to an arrangement comprising such a gear train unit according to the preambles of the independent claims.

BACKGROUND OF THE INVENTION

Gear train units having a plurality of planetary gear train stages, which are connected one after the other, are employed when extremely high torques are required at low rotary speeds.

In case the gear reduction of the planetary gear train stages, which are connected one after the other, is required only temporarily and in normal operation a smaller or no gear reduction is required, which e.g. is the case with creep speed gear units for mechanical presses, it is desirable that the gear unit in addition provides the gear ratio required for normal operation and can be shifted without using any tools back and forth between the two gear ratios, for allowing an easy switching between normal operation and creep speed operation.

Often, it is not only important that the gear unit is inexpensive and sturdy, but that it is also of as compact as possible design in order to be able to be integrated into existing mechanical parts, e.g. into the belt pulley of the belt drive of the press.

Hence, there arises the objective to provide a shiftable gear train unit having a plurality of planetary gear train stages, which are connected one after the other, which is inexpensive, sturdy and as compact as possible.

SUMMARY OF THE INVENTION

This objective is achieved by the gear train unit of the present invention.

Accordingly, a first aspect of the invention relates to a gear train unit having a plurality of planetary gear train stages, which are connected one after the other, which gear train unit preferably is suitable for connecting a drive motor, like e.g. an electric motor or a hydraulic motor, to a work machine, namely preferably to a automatic punching press or to a stamping press, respectively. The gear train unit is shiftable in such a manner that it alternatively provides a first or a second gear ratio. The term "shiftable" gear train unit here means a gear train unit the gear ratio of which can be changed without any structural modifications or interventions, preferably without employing any tools by actuating shifting means, like e.g. a shifting lever or an actuating button.

The planetary gear train stages of the gear train unit each comprise a ring gear, a sun gear and a plurality of planet gears supported on a planet gear carrier, wherein in each case the sun gear of the planetary gear train stage which is following in the direction of the flow of forces is formed by the planet gear carrier of the preceding planetary gear train stage or, in a torsionally rigid manner in rotational direction of this planet gear carrier, is connected or connectable to same.

Further, the gear train unit comprises a drive element, which forms the sun gear of the first planetary gear train stage in direction of the flow of forces or, in a torsionally rigid manner in rotational direction of this sun gear, is connected or connectable to same, for driving the sun gear.

Some of the planet gear carriers or all planet gear carriers of the planetary gear train stages are supported on the drive element, preferably by means of roller bearings.

The gear train unit also comprises an output element, which forms the planet gear carrier of the last of the planetary gear train stages, which are connected one after the other, or is connected or connectable in a torsionally rigid manner in rotational direction of this planet gear carrier to same, for driving a component part or a machine which shall be driven by the gear train unit.

In the intended operation those section of the drive element, on which some of the planet gear carriers or all of the planet gear carriers are supported, transmits the torque for driving the sun gear of the first planetary gear train stage. By the invention it becomes possible to provide a shiftable gear train unit comprising a plurality of planetary gear train stages, which are connected one after the other, which is inexpensive, sturdy and extremely compact and at which the drive element and the output element are accessible from the same side of the gear unit.

In a preferred embodiment of the gear train unit, the sun gear of the first planetary gear train stage of the gear train unit is arranged at one end of the drive element. By this a compact design of the gear train unit is further promoted.

In a further preferred embodiment of the gear train unit, the drive element is supported in the area of the sun gear of the first planetary gear train stage, preferably in at least one roller bearing, wherein it is furthermore preferred that the supporting takes place on a component part which is stationary in operation.

In that case it is further preferred that the support is designed as a fixed bearing, preferably with a cylinder roller bearing as thrust bearing and a needle roller bearing as journal bearing.

These structural designs promote an inexpensive and sturdy supporting of the drive element.

If in that case at least some of the support is arranged within the sun gear of the first planetary gear train stage, which is preferred, in particular in combination with a sun gear of the first planetary gear train stage arranged at the end of the drive element especially compact supporting solutions can be realized.

In still a further preferred embodiment of the gear train unit, the section of the drive element on which some or all planet gear carriers are supported is, preferably together with the sun gear of the first planetary gear train stage, made of one-piece design, namely preferably as hollow shaft body in one-piece design. Such a design of the drive element is especially sturdy and assists in reducing the number of component parts.

Preferably, the output element of the gear train unit according to the invention is designed in such a manner that it allows a direct connecting to a work machine.

In that case it is further preferred that the gear train unit is integrated into a housing, which at the same time forms the output element and at its outer circumference comprises a running surface for a V-belt or a flat belt, or gear teeth for a toothed belt, a chain or a gearwheel, for connection to a respective drive element of a work machine. That is to say the housing, which to the greatest possible extend or completely surrounds the gear train unit, in operation rotates around the rest of the gear train components and is designed in such a manner that its rotational movement, by means of suitable transmission means like e.g. flat belts, V-belts or toothed belts, chains or gear wheels, can be transmitted to the drive shaft of a work machine. By this it becomes possible to design especially compact gear train units according to the invention, which furthermore can be well integrated into existing mechanical parts, e.g. into the belt pulley of the belt drive of a press.

Also it is preferred in that case that the planet gear carrier of the last gear train stage is rigidly connected to the housing of the gear train unit. By this, a compact and sturdy design is further promoted.

Further it is preferred that the drive element of the gear train unit is designed in such a manner that it allows a direct connecting of the gear train unit to a drive motor. In particular in combination with an output element which permits a direct connecting of the gear train unit to a work machine, a gear train unit results which is universally deployable.

In still a further preferred embodiment of the gear train unit, the ring gears of all planetary gear train stages are formed by a common component part which preferably is composed of several parts, by means of which the manufacturing may be simplified and the ring gears can be individually exchanged in case of wear.

Further it is preferred that the first gear ratio of the gear train unit is 1:1, that is to say the output element rotates in operation at the same rotational speed as the drive element.

If in that case the gear train unit is designed in such a manner that the gear train unit is locked when the first gear ratio is chosen, which is preferred, the advantage is arrived at that in operation with the first gear ratio no frictional losses are generated in the gear unit, thus there are practically no power losses between drive element and output element.

In the latter case at embodiments of the gear train unit, at which the ring gears of planetary gear train stages are formed by a common component part, it is preferred that the shiftability of the gear train unit is realized in that the component part which forms the ring gears of the planetary gear train stages can alternatively be coupled to a component which in operation is static or to the drive element. In this way it is possible to shift back and forth between the second gear ratio and the locking of the gear unit (first gear ratio 1:1).

For this, the gear train unit by advantage is designed in such a manner that the component which forms the ring gears of the planetary gear train stages, for being alternatively coupled to the component which in operation is static and to the drive element can axially be shifted between a first and a second position, thereby in each case establishing a frictional connection and/or positive locking in rotational direction with the component which in operation is static or with the drive element, respectively. Such a structural design makes possible mechanically sturdy and at the same time compact solutions.

In that case the gear train unit preferably is furthermore designed in such a manner that the shifting of the component, which forms the ring gears of the planetary gear train stages, at least in one of the two shifting directions can be effected by means of a pneumatic or hydraulic drive, in particular by means of one or several pneumatic piston-cylinder-units. By means of this, the shifting of the gear train unit can in an easy manner be automated or be carried out by means of a central machine control, respectively.

Furthermore it is preferred in this case that the gear train unit is designed in such a manner that that the shifting of the component part which forms the ring gears of the planetary gear train stages in a first of the two shifting directions can be effected by means of a pneumatic drive against a resilient reset force which is generated by one or several elastic spring elements and that, when the pneumatic or hydraulic drive is depressurized, a resetting takes place through a shifting of the component part which forms the which forms the ring gears of the planetary gear train stages in the second shifting direction which is opposite to the first shifting direction. In this way, when the pneumatic or hydraulic drive is depressurized, the gear train unit has a defined shifting position, wherein it is preferred that this is the shifting position in which the gear train unit provides the first gear ratio according to the claims, since this gear ratio is typically intended for the normal use and consequently a system failure in the normal operation will not result in a switching of the gear train unit.

In still a further preferred embodiment of the gear train unit, the planetary gear train stages comprise a different number of planet gears, such that a planetary gear train stages comprises the more planet gears the more planetary gear train stages are preceding it, or said in other words, the further downstream in power flow direction of the drive element the planetary gear train stage is located. Thus, with increasing torque or with decreasing rotational speed, respectively, more planet gears are present. By means of this, the loading of the individual planet gears can be kept relatively small.

If the planet gears of all planetary gear train stages of the gear train unit have an identical diameter, which is preferred, they can be designed identically. This results in the advantage that only one type of planet gears must be used, whereby costs involved in manufacturing and warehousing can be reduced.

Due to the same reasons as mentioned before it is further preferred that the ring gears of all planetary gear train stages of the gear train unit have an identical diameter and preferably are identical with respect to their toothing modulus.

In still a further preferred embodiment of the gear train unit, the second gear ratio is a gear reduction of more than 1:15, that is to say the drive element rotates in operation more than fifteen times faster than the output element. Approximately starting from this gear reduction ratio approximately comparable stamping forces result when driving typical stamping presses having a crank gear and a flywheel with the gear train unit both in the normal operation and in the creep speed operation.

A second aspect of the invention relates to an arrangement comprising a gear train according to the first aspect of the invention, which furthermore comprises the following components:

a) a stamping press or automatic punching press, respectively, having a crank gear or an eccentric gear for converting the rotational movement of a drive shaft of the stamping press into the stamping movement of stamping tool and having a flywheel that is coupled or can be coupled to the drive shaft; and b) a drive motor for driving the drive shaft of the stamping press.

The drive element of the gear train unit is coupled to or can be coupled via a shiftable coupling to the drive motor and the output element of the gear train unit is coupled to or can be coupled via a shiftable coupling to the drive shaft of the stamping press or automatic punching press, respectively, or to the flywheel.

The formation of such arrangements constitutes a preferred usage of the gear train unit according to the invention and makes the advantages of the invention to clearly become apparent, because thanks to the gear train unit it becomes possible at such arrangements to operate the stamping press or automatic punching press, respectively, by means of a motor which is dimensioned for normal operation with flywheel, alternatively in normal operation at high stamping frequencies or in creep speed operation for the adjusting and testing of stamping tools.

In a preferred embodiment of the arrangement the drive motor and the gear ratios of the gear train unit are dimensioned in such a manner that the maximum stamping force, which can be generated at the ram of the stamping press when operating the press with those gear ratio of the gear train unit in which the more slow rotation of drive shaft results (creep speed operation), is equal to or bigger than the maximum stamping force, which can be generated at the ram of the stamping press when operating the press with those gear ratio of the gear train unit in which the more quick rotation of drive shaft results (normal operation). Thus, the drive motor and the gear ratios are chosen in such a manner that in creep speed operation the torque of the drive motor, which is increased due to the gear reduction, is equal to or bigger than in normal operation the sum of the torque of the drive motor and the torque which is provided for the stamping process by the flywheel. By this it becomes possible to operate the stamping press or automatic punching press, respectively, both in normal operation at high stamping frequencies and in creep speed operation for the adjusting and testing of stamping tools at full stamping force.

In a preferred embodiment of the arrangement, the flywheel is formed by the housing of the gear train unit, by which the advantage is arrived at that the arrangement can be designed especially compact.

BRIEF DESCRIPTION OF THE DRAWINGS

Further preferred embodiments of the invention arise from the following description on the basis of the drawings.

DESCRIPTION OF THE PREFERRED EMBODIMENTS

Figure 1:
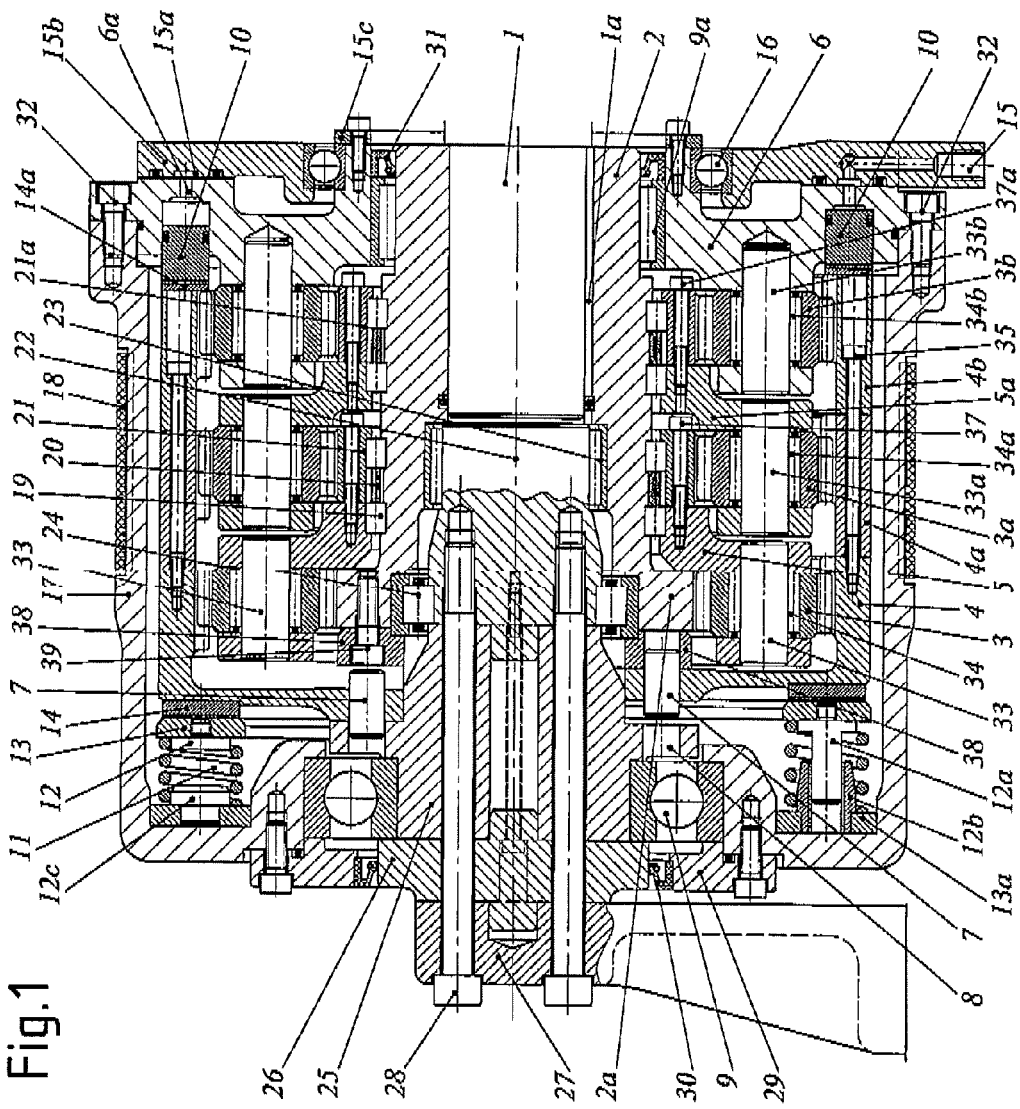
FIG. 1 is a longitudinal section of a gear train unit according to the invention.

FIG. 1 shows a shiftable gear train unit according to the invention having three planetary gear stages, which are connected one after the other, in vertical section, in the upper half in a shifting status in which the gear unit is operative and in the lower half in a status in which the gear unit is locked (i.e. gear ratio 1:1).

As can be seen, the gear train unit comprises a central drive element 2, which at one of its two ends is coupled to a horizontal shaft 1 of an electric motor 46 (shown in FIGS. 2 and 3) and at its other end forms the sun gear 2a of the first planetary gear train stage. In the intended operation, the electric motor 46 by means of key connection 1a drives the drive element 2 and via same the sun gear 2a of the first planetary gear train stage. The drive element 2, in the area of the sun gear 2a which is formed by it, is by means of a roller bearing 24 axially and radially supported on a fixed pivot 22, 25, 26 and by means of a needle roller bearing 23 solely radially supported. Thereby, the roller bearing 24 is arranged within the sun gear 2a.

In the first planetary gear train stage of the gear train unit, four first planet gears 3 are in engagement with the first sun gear 2a and with a cup-shaped first ring gear 4 with internal toothing. The four first planet gears 3 are by means of bolts 33 and needle roller assemblies 34 rotatably and to both sides supported in a first planet gear carrier 5.

This planet gear carrier 5 transfers the increased torque via screws 37 to the sun gear 21 of the second planetary gear train stage. The planet gear carrier 5 with the second sun gear 21 for driving the second planetary gear train stage, which is attached to it, is supported on the drive element 2 by means of cylindrical rollers 19 and a cage 20.

In the second planetary gear train stage, five second planet gears 3a are in engagement with the second sun gear 21 and with a cup-shaped second ring gear 4a with internal toothing. The five second planet gears 3a are supported in the second ring gear 4a and transfer the torque by means of bolts 33a and needle roller assemblies 34a, supported on both sides, to a second planet gear carrier 5a. This second planet gear carrier, as already the planet gear carrier 5 of the first planetary gear train stage, transfers the increased torque via screws 37a to the sun gear 21a of the next, namely the third planetary gear train stage. The second planetary gear carrier 5a with the third sun gear 21a for driving the third planetary gear train stage, which is attached to it, is in turn, in an identical manner as in the first planetary gear train stage, supported on the drive element 2 by means of cylindrical rollers and a cage.

In the third planetary gear train stage, eight third planet gears 3b are incorporated, which are supported in a third ring gear 4b and transfer their torque by means of further bolts 33b and needle roller assemblies 34b, supported in a not-flying manner, to a third planet gear carrier 6. This carrier 6 is by means of screws 32 fixedly connected to the housing 17 of the gear train unit, which drives the toothed belt 18.

In this way, the torque of the electric motor 46 can, in the state shown in the upper half of FIG. 1, via several stages be brought to a very high level. In this case, a pneumatic ring piston 10 is loaded with compressed air and pushes the ring gears 4, 4a, 4b, which are connected by screws 35, to the left against the stationary pivot 25 which is not rotatable, where they engage with several cylindrical pins 7 which are arranged at the first ring gear 4 into boreholes in the pivot 25. Instead of pins it is also envisaged to provide a frontal toothing at the first ring gear 4 and at the pivot 25, by means of which a corresponding positive locking can be established.

Starting from the state shown in the lower half of FIG. 1, the before described state is established in that, while the pneumatic ring piston 10 is loaded with compressed air, by slowly rotating the shaft 1 of the electric motor 46, which is equipped with shaft control, the cylindrical pins 7 are aligned with the boreholes in the pivot 25 and subsequently catch in the pivot 25.

The group of ring gears 4, 4a, 4b at the opposite side of the ring piston 10 is loaded by a pressure ring 13, which together with several helical pressure springs 11 ensures that, when the ring piston 10 is unloaded, the entire group of ring gears 4, 4a, 4b is shifted back into the position according to the lower half of FIG. 1 (basic position). The springs 11 on their backsides are supported by a rear ring 13a.

In the state shown in the upper half of FIG. 1, the ring gears 4, 4a, 4b stand still and the entire planetary gear unit is active in very slow rotation. This means that the toothed belt 18 and the housing 17 which forms the toothed belt disc in this practical example rotate 19-times slower than the motor shaft 1 and a relative movement results with respect to the still standing ring gears 4, 4a, 4b.

Because of this reason, on the ring piston side a sliding ring 14a and at the spring side a sliding ring 14 is fixedly attached to the ring gears 4, 4a, 4b. These sliding rings 14, 14a provide for a wear-free sliding also under the pressure loading of the piston 10 and the springs 11. In order to position the individual springs 11 on the front ring 13 and the rear ring 13a, spring guides are provided ahead 12 and behind 12c. In order to in addition also guide the front ring 13 with respect to the rear ring 13a, specific spring guides 12a having guide bushings 12b are provided at three locations equally distributed over the circumference.

In order to supply the compressed air into the rotating gear unit, a supply 15 is provided, which supplies the ring piston 10 via a ring groove 15a and several boreholes 6a in the third planet gear carrier 6. This supply 15 is formed by a ring-shaped lid 15b, which is supported by means of a ball bearing 16 that is sealed on both sides on the third planet gear carrier 6, wherein the bearing 16 is axially fixed by means of a ring 15c. The housing 17 with toothed belt 18 is via a lid 29 on the left side mounted on a roller bearing 9 and axially fix supported on the static elements 25, 26, 27. These are connected to each other by means of screws 28. A shaft sealing 30 closes the left side. On the opposite side, the floating bearing 9a is supported in axially free manner on the first drive wheel 2, which in operation rotates. A shaft sealing 31 closes here. The supporting against outwards is performed on this side by the front bearing of the electric motor 46. Same correspondingly has to be mounted exact in line and at the same height to the gear train unit. The required matching can for example be achieved by adapting the support stand 27 with regard to height and shape.

For switching off or bypassing the gear unit at standstill, the space behind the piston 10 must be depressurized. Due to the force of the springs 11, starting from the position shown in the upper half of FIG. 1, the group of ring gears 4, 4a, 4b by means of the sliding ring 14 and the pressure piston 10 by means of the sliding ring 14a are pushed to the right into the position shown in the lower half of FIG. 1. By rotating the motor shaft 1 very slowly, the pins 7 are introduced into the corresponding boreholes in the flange 38, which is by means of screws 39 mounted to the drive wheel 2. In this gear position the first sun gear 2a on the one hand is via the pins 7 directly connected with the group of ring gears 4, 4a, 4b and on the other hand is connected with the four first planet gears 3, which also engage the first ring gear 4. Thus, the entire gear train unit is locked or bypassed, respectively, and the housing 17 which is forming the belt disc assumes the same rotation speed as the shaft 1 of the electric motor 46.

Figure 2:
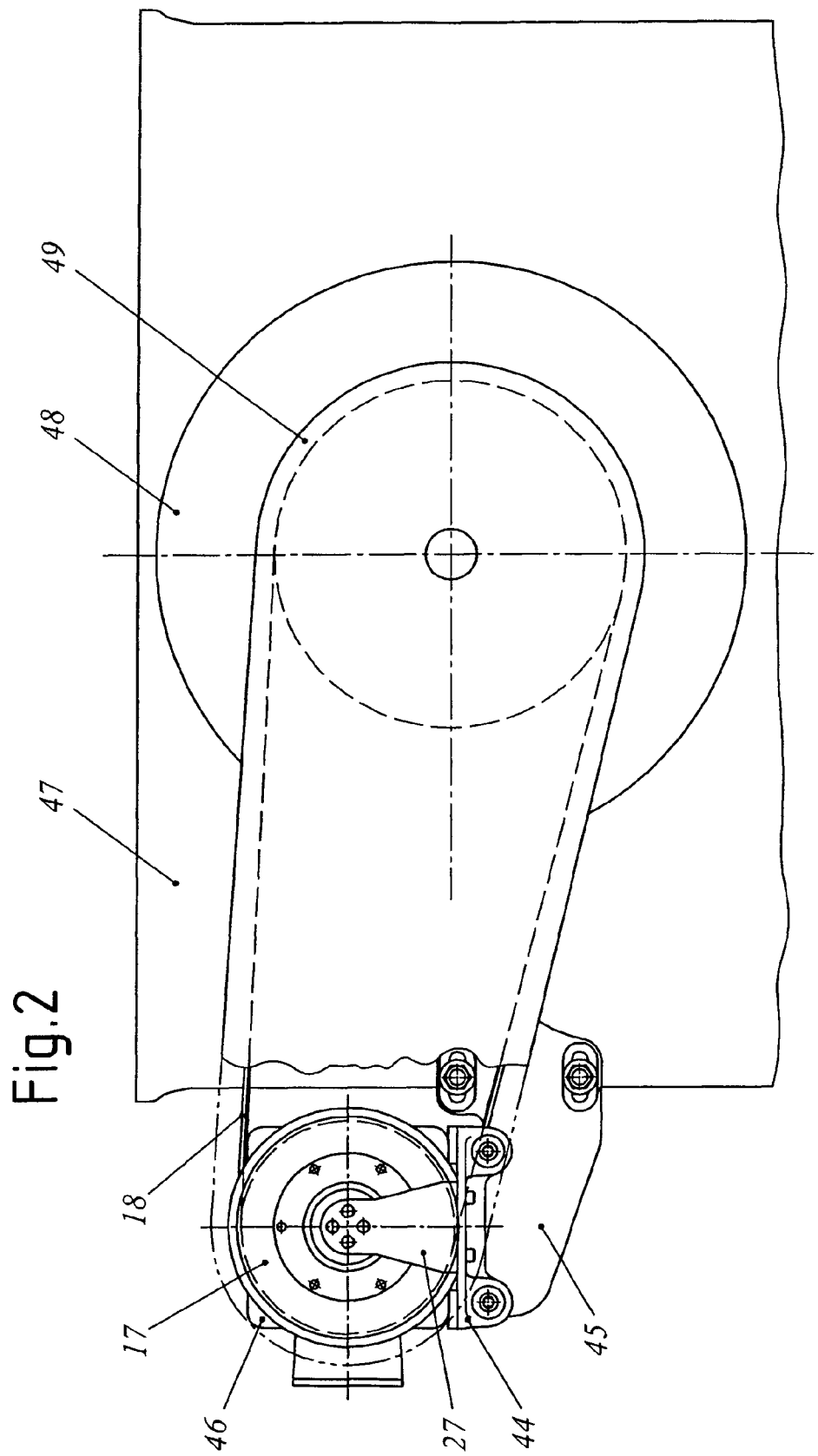
FIG. 2 is a part of a back view of an arrangement according to the invention with the gear train unit of FIG. 1.
Figure 3:
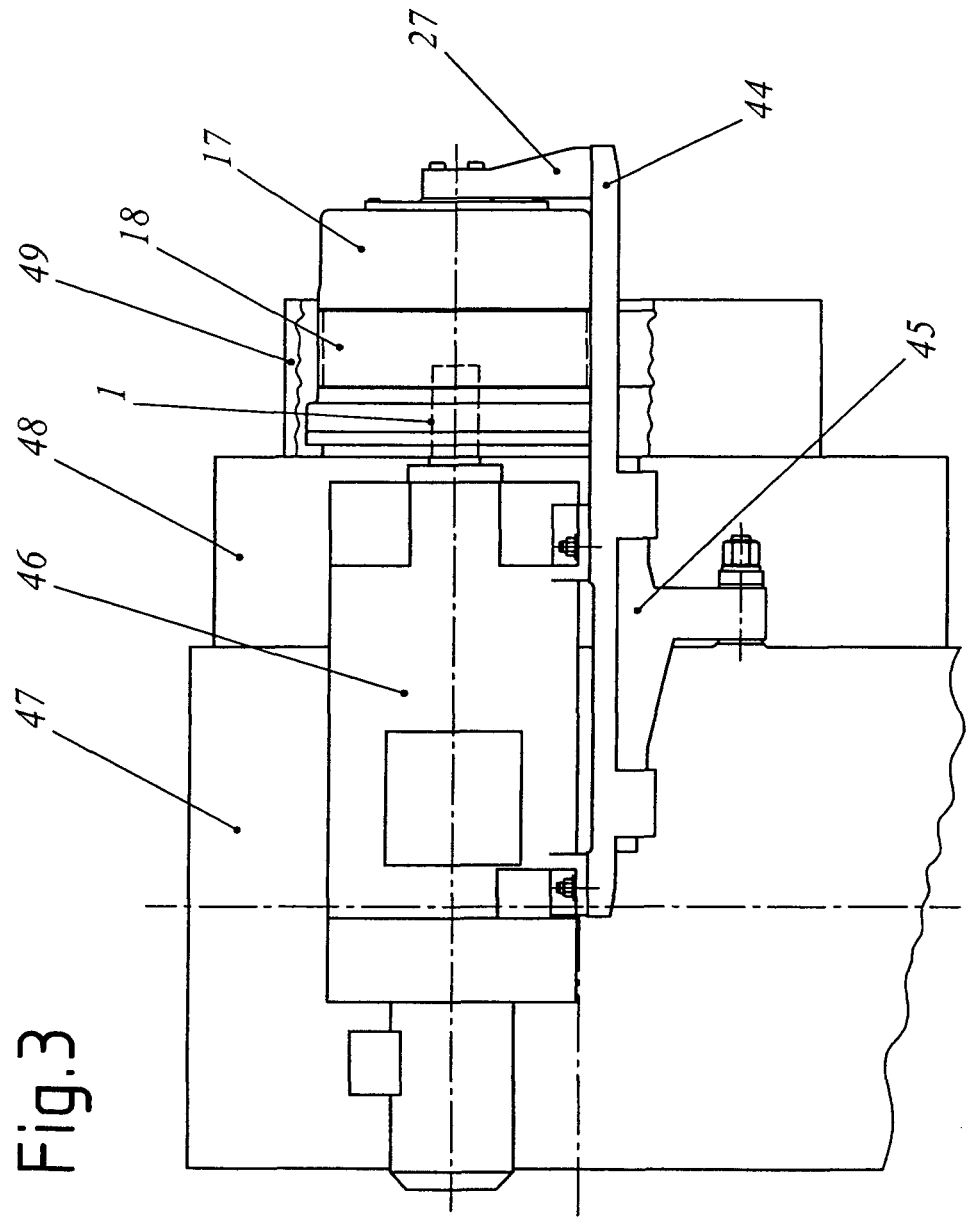
FIG. 3 is a part of a side view of the arrangement of FIG. 2.

The presentations according to the FIGS. 2 and 3 show an arrangement according to the invention comprising the gear train unit of FIG. 1 and a stamping press 47 which is driven therewith, once in a partial back view (FIG. 2) with the so called main drive and once in a partial side view (FIG. 3) with the motor suspension.

As can be seen, the electric motor 46 with the gear train unit is mounted onto a console 44, which by means of rubber dampers is mounted on a motor carrier 45, which in turn is mounted to the upper portion 47 of the press. The motor carrier 45 can laterally be shifted, for pre-tensioning the belt 18. The flywheel of the stamping press is arranged behind a cladding 48 and a belt guard 49 prohibits the access to the belt 18.

In order to facilitate an easy checking of the switching status of the gear train unit, it is envisaged to lengthen one of the three specific spring guides 12a and to guide it in a sealed manner to the outside, so that its axial position is visible from the outside or can be detected by a position sensor, for identifying the particular switching status of the gear train unit.

While there are in the present application described preferred embodiments of the invention it is to be distinctly understood that the invention is not limited thereto but may be otherwise variously embodied and practised within the scope of the following claims.

The invention claimed is:

1. A gear train unit comprising:
a plurality of planetary gear train stages, which are connected one after the other and which each comprise a ring gear (4, 4a, 4b), a sun gear (2a, 21, 21a) and a plurality of planet gears (3, 3a, 3b) supported on a planet gear carrier (5, 5a, 6), wherein the sun gear (2a, 21, 21a) of each following planetary gear train stage is formed by the planet gear carrier (5, 5a) of the preceding planetary gear train stage or, in a torsionally rigid manner in rotational direction of this planet gear carrier (5, 5a), is connected or connectable to this planet gear carrier,
a drive element (2), which forms the sun gear (2a) of the first planetary gear train stage or, in a torsionally rigid manner in rotational direction of this sun gear (2a), is connected or connectable to this sun gear, and
an output element (17), which forms the planet gear carrier (6) of the last of the planetary gear train stages which are connected one after the other or, in a torsionally rigid manner in rotational direction of this planet gear carrier (6), is connected or connectable to same,
wherein the gear train unit can be shifted in such a way that either a first or a second gear ratio can be set,
wherein at least some of the planet gear carriers (5a, 5b, 6) of the planetary gear train stages, in particular by means of roller bearings (19, 20), are supported on the drive element (2),
wherein the section of the drive element (2), on which the planet gear carriers (5a, 5b, 6) are supported, in the intended operation transmits the torque for driving the sun gear (2a) of the first planetary gear train stage,
wherein the drive element (2) is adapted for being connected to a drive motor,
wherein the output element (17) is adapted for being connected to a work machine, and
wherein the gear train unit is integrated into a housing (17), which at the same time forms the output element (17) and at its outer circumference comprises a running surface for a V-belt or a flat belt, or gear teeth (18) for a toothed belt, a chain or a gearwheel, for connection to a respective drive element of a work machine.

2. Gear train unit according to claim 1, wherein the sun gear (2a) of the first planetary gear train stage is arranged at one end of the drive element (2).

3. Gear train unit according to claim 1, wherein the drive element (2) is supported in the area of the sun gear (2a) of the first planetary gear train stage, in particular by means of at least one roller bearing (23, 24), and in particular, wherein this supporting takes place on a component part (25) which is stationary in operation.

4. Gear train unit according to claim 3, wherein the support is designed as a fixed bearing, in particular with a cylinder roller bearing (24) as thrust bearing and a needle roller bearing (23) as journal bearing.

5. Gear train unit according to claim 3, wherein at least some of the support (24) is arranged within the sun gear (2a) of the first planetary gear train stage.

6. Gear train unit according to claim 1, wherein the section of the drive element (2), on which the planet gear carriers (5a, 5b, 6) are supported, in particular together with the sun gear (2a) of the first planetary gear train stage is of one-piece design, in particular is designed as hollow shaft body in one-piece design.

7. Gear train unit according to claim 1, wherein the ring gears (4, 4a, 4b) of all planetary gear train stages are formed by a common component part (4, 4a, 4b), which in particular is composed of several parts (4, 4a, 4b).

8. Gear train unit according to claim 1, wherein the first gear ratio is 1:1.

9. Gear train unit according to claim 8, wherein the gear train unit is designed in such a manner that when the first gear ratio is set, the gear train unit is locked.

10. Gear train unit according to claim 7, wherein the shiftability of the gear train unit is realized in that the component part which forms the ring gears (4, 4a, 4b) of the planetary gear train stages can alternatively be coupled to a component (25) which in operation is static or to the drive element (2).

11. Gear train unit according to claim 10, wherein the gear train unit is designed in such a manner that the component part, which forms the ring gears (4, 4a, 4b) of the planetary gear train stages, for being alternatively coupled to the component (25) which in operation is static or to the drive element (2), can axially be shifted between a first and a second position, thereby in each case generating a rotational frictional connection and/or positive locking with the component (25) which in operation is static or with the drive element (2), respectively.

12. Gear train unit according to claim 11, wherein the gear train unit is designed in such a manner that the shifting of the component part which forms the ring gears (4, 4a, 4b) of the planetary gear train stages at least in one of the two shifting directions can be effected by means of a pneumatic or hydraulic drive, in particular by means of one or several pneumatic piston-cylinder-units (10).

13. Gear train unit according to claim 12, wherein the gear train unit is designed in such a manner that the shifting of the component part which forms the ring gears (4, 4a, 4b) of the planetary gear train stages in a first of the two shifting directions can be effected by means of a pneumatic or hydraulic drive (10) against a resilient reset force which is generated by one or several elastic spring elements (11) and that, when the pneumatic or hydraulic drive (10) is depressurized, a resetting takes place through a shifting in the second shifting direction which is opposite to the first shifting direction.

14. Gear train unit according to claim 1, wherein the planetary gear train stages have different numbers of planet gears (3, 3a, 3b), such that the planetary gear train stages have the more planet gears (3, 3a, 3b) the more planetary gear train stages are preceding them.

15. Gear train unit according to claim 1, wherein the planet gears (3, 3a, 3b) of all planetary gear train stages have an identical diameter, and in particular are identical.

16. Gear train unit according to claim 1, wherein the ring gears (4, 4a, 4b) of all planetary gear train stages have an identical diameter, and in particular are identical with regard to their teeth modulus.

17. Gear train unit according to claim 1, wherein the second gear ratio is a gear reduction of more than 1:15.

18. An arrangement comprising:
a gear train unit comprising:
a plurality of planetary gear train stages, which are connected one after the other and which each comprise a ring gear (4, 4a, 4b), a sun gear (2a, 21, 21a) and a plurality of planet gears (3, 3a, 3b) supported on a planet gear carrier (5, 5a, 6), wherein the sun gear (2a, 21, 21a) of each following planetary gear train stage is formed by the planet gear carrier (5, 5a) of the preceding planetary gear train stage or, in a torsionally rigid manner in rotational direction of this planet gear carrier (5, 5a), is connected or connectable to this planet gear carrier,
a drive element (2), which forms the sun gear (2a) of the first planetary gear train stage or, in a torsionally rigid manner in rotational direction of this sun gear (2a), is connected or connectable to this sun gear, and
an output element (17), which forms the planet gear carrier (6) of the last of the planetary gear train stages which are connected one after the other or, in a torsionally rigid manner in rotational direction of this planet gear carrier (6), is connected or connectable to same,
wherein the gear train unit can be shifted in such a way that either a first or a second gear ratio can be set,
wherein at least some of the planet gear carriers (5a, 5b, 6) of the planetary gear train stages, in particular by means of roller bearings (19, 20), are supported on the drive element (2), and
wherein the section of the drive element (2), on which the planet gear carriers (5a, 5b, 6) are supported, in the intended operation transmits the torque for driving the sun gear (2a) of the first planetary gear train stage,
a stamping press having a crank gear or an eccentric gear for converting the rotational movement of a drive shaft of the stamping press into the stamping movement of stamping tools and having a flywheel that is coupled or can be coupled to the drive shaft; and
a drive motor (46) for driving the drive shaft of the stamping press;
wherein the drive element (2) of the gear train unit is coupled to or can be coupled via a shiftable coupling to the drive motor (46) and the output element (17) of the gear train unit is coupled to or can be coupled via a shiftable coupling to the drive shaft of the stamping press or to the flywheel.

19. Arrangement according to claim 18, characterized in that the drive motor (46) and the gear ratios of the gear train unit are dimensioned in such a manner that the maximum stamping force, which can be generated at the ram of the stamping press when operating the press with those gear ratio of the gear train unit in which the more slow rotation of the drive shaft results, is equal to or bigger than the maximum stamping force, which can be generated at the ram of the stamping press when operating the press with those gear ratio of the gear train unit in which the more quick rotation of the drive shaft results.

20. Arrangement according to claim 18, characterized in that the flywheel is formed by the housing (17) of the gear train unit.

* * * * *